United States Patent
Takahashi

(10) Patent No.: US 12,391,193 B2
(45) Date of Patent: Aug. 19, 2025

(54) IMAGING SYSTEM, MOVABLE APPARATUS, AND STORAGE MEDIUM

(71) Applicant: CANON KABUSHIKI KAISHA, Tokyo (JP)

(72) Inventor: Makoto Takahashi, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 105 days.

(21) Appl. No.: 18/531,926

(22) Filed: Dec. 7, 2023

(65) Prior Publication Data
US 2024/0217452 A1 Jul. 4, 2024

(30) Foreign Application Priority Data
Dec. 28, 2022 (JP) ................. 2022-211801

(51) Int. Cl.
*H04N 11/04* (2006.01)
*B60R 11/04* (2006.01)
*G06V 20/59* (2022.01)

(52) U.S. Cl.
CPC ............ *B60R 11/04* (2013.01); *G06V 20/597* (2022.01)

(58) Field of Classification Search
CPC ............................. B60R 11/04; G06V 20/597
See application file for complete search history.

(56) References Cited

U.S. PATENT DOCUMENTS

| | | | | |
|---|---|---|---|---|
| 6,128,145 A * | 10/2000 | Nagaoka | ................ | H04N 7/183 348/E7.087 |
| 7,605,856 B2 * | 10/2009 | Imoto | ................ | B60R 1/23 348/335 |
| 7,697,055 B2 * | 4/2010 | Imoto | ................ | B60R 1/28 348/335 |
| 2005/0083405 A1 * | 4/2005 | Imoto | ................ | B60R 1/23 348/148 |
| 2005/0083427 A1 * | 4/2005 | Imoto | ................ | H04N 23/55 348/E7.087 |
| 2023/0098424 A1 * | 3/2023 | Mori | ................ | H04N 23/70 382/103 |
| 2023/0113406 A1 * | 4/2023 | Mori | ................ | G06V 20/58 382/181 |
| 2024/0111134 A1 * | 4/2024 | Takahashi | ................ | G02B 13/00 |

(Continued)

FOREIGN PATENT DOCUMENTS

JP 2021-122114 A 8/2021

*Primary Examiner* — James M Pontius
(74) *Attorney, Agent, or Firm* — Venable LLP

(57) ABSTRACT

An imaging system includes an imaging unit and an optical system configured to form a low-resolution area at the center of a light receiving surface of the imaging unit and form a high-resolution area in the periphery of the light receiving surface. The optical system is disposed in an upper part of a cabin of a movable apparatus such that an optical axis of the optical system faces downward with respect to a horizontal plane in a state in which the movable apparatus has a horizontal posture. When a focal distance of the optical system is defined as $f$, a half viewing angle is defined as $\theta$, an image height on an image plane is defined as $y$, projection characteristics indicating a relationship between the image height $y$ and the half viewing angle $\theta$ are defined as $y(\theta)$, and a maximum half viewing angle of the optical system is defined as $\theta max$, the optical system is configured to satisfy $0.1 < 2 \times f \times \tan(\theta max/2)/y(\theta max) < 1.2$.

23 Claims, 13 Drawing Sheets

(56) References Cited

U.S. PATENT DOCUMENTS

| | | | | |
|---|---|---|---|---|
| 2024/0177492 | A1* | 5/2024 | Sugimoto | H04N 7/181 |
| 2024/0217439 | A1* | 7/2024 | Horikawa | H04N 7/181 |
| 2024/0221383 | A1* | 7/2024 | Kanai | G06V 20/56 |
| 2024/0259671 | A1* | 8/2024 | Oka | H04N 23/69 |
| 2024/0357247 | A1* | 10/2024 | Kobayashi | B60R 11/02 |
| 2025/0133295 | A1* | 4/2025 | Kobayashi | G06V 10/14 |

\* cited by examiner

FIG. 3A
FIG. 3B
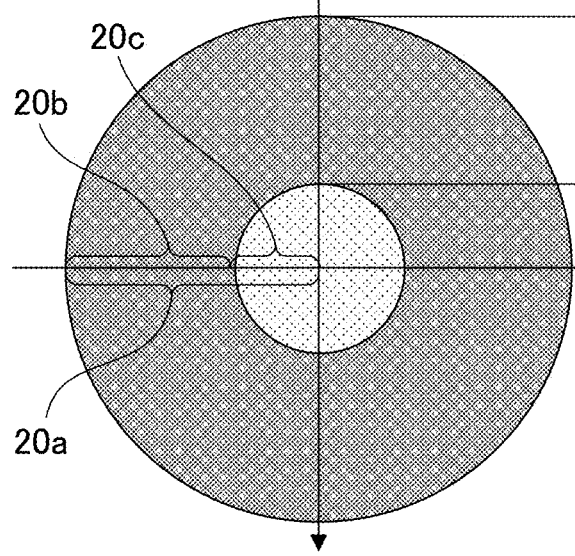
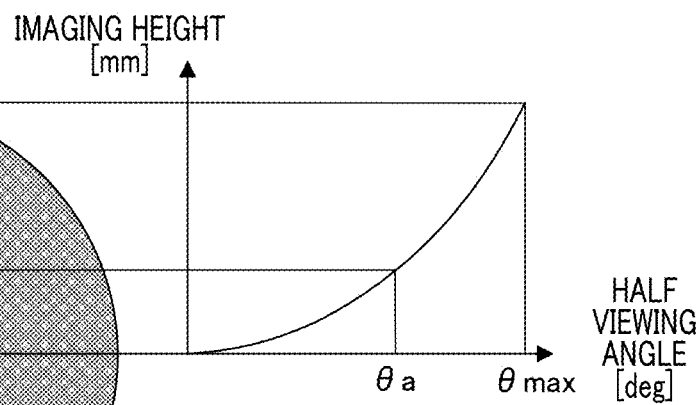

IMAGING SYSTEM, MOVABLE APPARATUS, AND STORAGE MEDIUM

BACKGROUND OF THE INVENTION

Field of the Invention

The present invention relates to an imaging system, a movable apparatus, and a storage medium.

Description of the Related Art

Recently, Problems such as infants being left behind in vehicle cabins or accidents based on depressing an accelerator pedal or a brake pedal in error have become an issue. Accordingly, it is conceivable that a camera for imaging a cabin be installed. Japanese Unexamined Patent Application Publication No. 2021-122114 discloses a drive recorder that captures an image in a range of 360 degrees in a horizontal direction using two cameras with a configuration for allowing the two cameras to capture an image in opposite directions and allowing one thereof to capture an image of a cabin.

However, since a so-called fish-eye lens is used in the configuration, there is a problem in that the size of a driver's face is reduced and a person on a rear seat is further reduced, for example, when directions of the cameras are set as illustrated in FIG. 13A. On the other hand, for example, when one camera is set to face rearward to mainly image a person on a rear seat as illustrated in FIG. 13B, there is a problem in that a driver's foot cannot be imaged.

SUMMARY OF THE INVENTION

According to an aspect of the present invention, there is provided an imaging system including an imaging unit and an optical system configured to form a low-resolution area at the center of a light receiving surface of the imaging unit and form a high-resolution area in the periphery of the light receiving surface, wherein the optical system is disposed in an upper part of a cabin of a movable apparatus such that an optical axis of the optical system faces downward with respect to a horizontal plane in a state in which the movable apparatus has a horizontal posture, and wherein, when a focal distance of the optical system is defined as f, a half viewing angle is defined as $\theta$, an image height on an image plane is defined as y, projection characteristics indicating a relationship between the image height y and the half viewing angle $\theta$ are defined as $y(\theta)$, and a maximum half viewing angle of the optical system is defined as $\theta max$, the optical system is configured to satisfy:

$$0.1 < 2 \times f \times \tan(\theta max/2)/y(\theta max) < 1.2.$$

Further features of the present invention will become apparent from the following description of embodiments with reference to the attached drawings.

BRIEF DESCRIPTION OF THE DRAWINGS

FIGS. 3A and 3B are diagrams illustrating optical characteristics of an imaging unit of the camera unit 12 according to the first embodiment.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment

Figure 1:
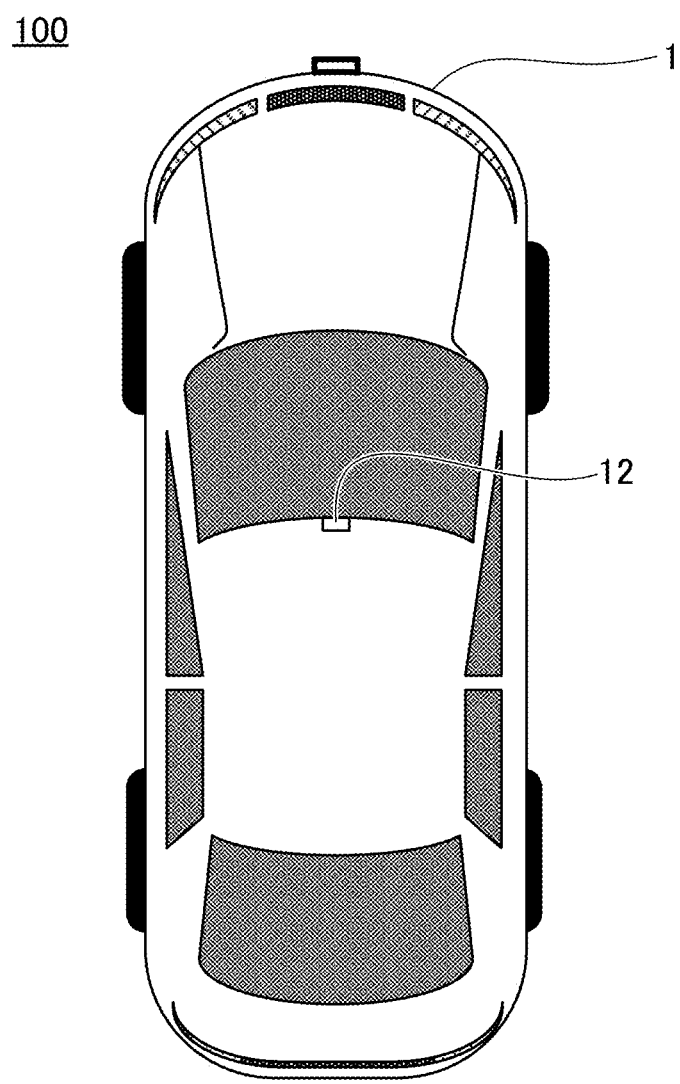
FIG. 1 is a bird's-eye view illustrating a positional relationship between a vehicle and a camera unit 12 in an imaging system according to a first embodiment.

FIG. 1 is a bird's-eye view illustrating a positional relationship between a vehicle and a camera unit 12 in an imaging system according to a first embodiment.

Figure 2:
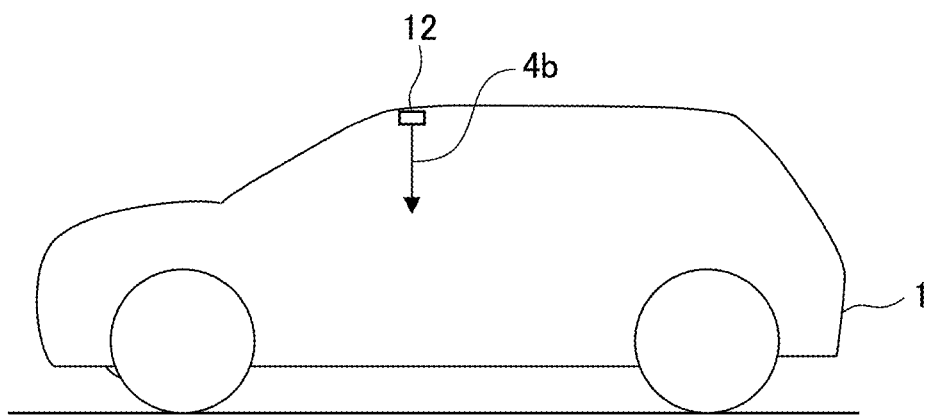
FIG. 2 is a side view illustrating the positional relationship between the vehicle and the camera unit 12 in the imaging system according to the first embodiment.

FIG. 2 is a side view illustrating the positional relationship between the vehicle and the camera unit 12 in the imaging system according to the first embodiment. In the present embodiment, the imaging system includes a camera unit and a vehicle 1 which is a movable apparatus.

The camera unit 12 serves as an imaging unit and includes an imaging device that captures an optical image and an optical system that forms an optical image on a light receiving surface of the imaging device. In the present embodiment, as illustrated in FIG. 1, for example, the camera unit 12 is installed near the ceiling above a driver's seat inside of (in a cabin of) a car which is a movable apparatus such that an optical axis of the optical system faces, for example, a vertical direction.

FIG. 2 is a side view illustrating the positional relationship between the vehicle and the camera unit 12 in the imaging system according to the first embodiment. As illustrated in FIG. 2, the camera unit 12 is disposed in an upper part near the ceiling inside of (in the cabin of) the movable apparatus, for example, such that the camera unit captures an image in the vertical direction.

The optical system of the camera unit 12 is configured to acquire an image with a low resolution at a viewing angle near the optical axis and to acquire an image with a high resolution at a viewing angle away from the optical axis by appropriately setting a distortion aberration. That is, the optical system according to the present embodiment can form a low-resolution area at the center of the light receiving surface of the imaging unit and form a high-resolution area in the periphery of the light receiving surface.

An imaging viewing angle at which an image with a high resolution can be captured is set such that a rear seat or a driver in the cabin or an outer part in front of the movable apparatus can be imaged as an image with a high resolution.

FIGS. 3A and 3B are diagrams illustrating optical characteristics of the imaging unit of the camera unit 12 according to the first embodiment. FIG. 3A illustrates an image height y at each half viewing angle on the light receiving surface of the imaging device of the optical system of the camera unit 12 according to the present embodiment in a contour line.

FIG. 3B illustrates projection characteristics indicating a relationship between an image height y and a half viewing angle θ of the optical system of the camera unit 12 according to the present embodiment. In FIG. 3B, a half viewing angle (an angle formed by the optical axis and an incident light beam) θ is set as the horizontal axis and an imaging height (an image height) y on a sensor plane (an image plane) of the camera unit 12 is set as the vertical axis.

The optical system of the camera unit 12 according to the present embodiment is configured such that the projection characteristics y(θ) differ between an area less than a predetermined half viewing angle θa and an area equal to or greater than the half viewing angle θa as illustrated in FIG. 3B. Accordingly, when an increase of the image height y with respect to the half viewing angle θ per unit is defined as a resolution, the resolution differs depending on areas.

The local resolution can also be expressed by a differential value dy(θ)/dθ of the projection characteristics y(θ) at a half viewing angle θ. That is, the resolution increases as the slope of the projection characteristics y(θ) in FIG. 3B increases. The resolution increases as a gap between the image heights y at each half viewing angle in the contour line shape of FIG. 3A increases.

In the present embodiment, a central area formed on the sensor plane when the half viewing angle θ is less than a predetermined half viewing angle θa is referred to as a low-resolution area 20c, and an outer area in which the half viewing angle θ is equal to or greater than the half viewing angle θa is referred to as a high-resolution area 20b.

In the first embodiment, the optical system of the camera unit 12 has projection characteristics y(θ) satisfying the conditions of Expression 1. That is, when a focal distance of the optical system is defined as f, a half viewing angle is defined as θ, an image height on an image plane is defined as y, projection characteristics indicating a relationship between the image height y and the half viewing angle θ are defined as y(θ), and a maximum half viewing angle of the optical system is defined as θmax, the projection characteristics y(θ) satisfy Expression 1.

$$0.1 < 2 \times f \times \tan(\theta max/2)/y(\theta max) < 1.2 \quad \text{(Expression 1)}$$

It is more preferable to satisfy Expression (2).

$$0.2 < 2 \times f \times \tan(\theta max/2)/y(\theta max) < 0.92 \quad \text{(Expression 2)}$$

A position at which the light receiving surface of the imaging device and the optical axis of the optical system cross may substantially match the center of the light receiving surface, but the position at which the light receiving surface of the imaging device and the optical axis of the optical system cross may be shifted from the center of the light receiving surface. In this case, when a width of the light receiving surface is defined as Ls1 and an amount of shift is defined as Lshift, it is preferable to satisfy 0<Lshift/Ls1<0.5.

Figure 4A:
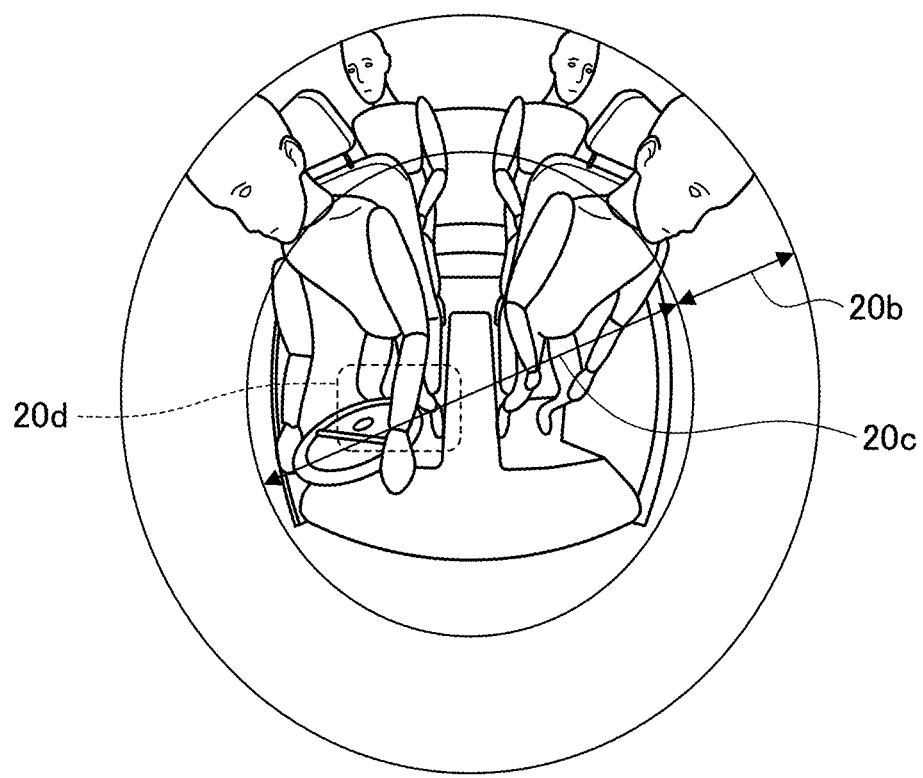
FIG. 4A is a diagram illustrating an example of an image of the camera unit according to the first embodiment.
Figure 4B:
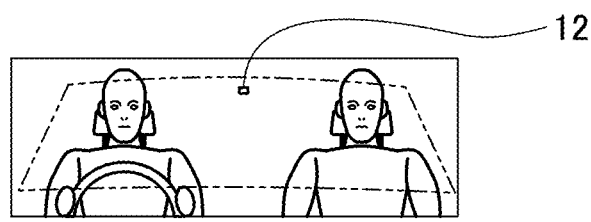
FIG. 4B is a diagram illustrating an example of a disposition position of the camera unit 12 when seen from the front of a movable apparatus.
Figure 4C:
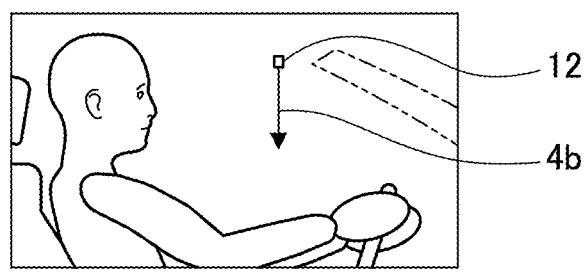
FIG. 4C is a diagram illustrating an example of the disposition position of the camera unit 12 when seen from one lateral side of a driver's seat.

FIG. 4A is a diagram illustrating an example of an image of the camera unit according to the first embodiment, FIG. 4B is a diagram illustrating an example of the disposition position of the camera unit 12 when seen from the front of the movable apparatus, and FIG. 4C is a diagram illustrating an example of the disposition position of the camera unit 12 when seen from one lateral side of a driver's seat of the movable apparatus.

As illustrated in FIG. 4A, in an image of the camera unit 12 according to the first embodiment, a face of a driver, a face of a person on a rear seat, a part of an outer part of the movable apparatus, and the like appear in the high-resolution area, and a foot 4a of the driver appears in the low-resolution area.

That is, the camera unit is installed such that a position in front of the driver's seat of the movable apparatus or a lower leg of a driver is included in the low-resolution area. As illustrated in FIG. 4A, the camera unit may be installed such that an outer part in front of the movable apparatus is included in the high-resolution area via a front windshield.

As illustrated in FIG. 4B, the camera unit 12 is disposed between the driver's seat and the passenger's seat. In FIG. 4B, the camera unit is disposed substantially at the center between the driver's seat and the passenger's seat, but may be disposed at a position other than the center.

As illustrated in FIG. 4C, the camera unit 12 is disposed on a front-upper side of the driver such that the vertical direction 4b is imaged. That is, the optical system according to the present embodiment is disposed in an upper part of the cabin of the movable apparatus such that the optical axis of the optical system faces downward with respect to the horizontal plane in a state in which the movable apparatus has a horizontal posture.

The camera unit 12 is disposed below a driver's head in FIG. 4C, but it may be disposed near the ceiling. That is, the height position of the camera unit 12 is not limited to the example illustrated in FIG. 4C.

Figure 5:
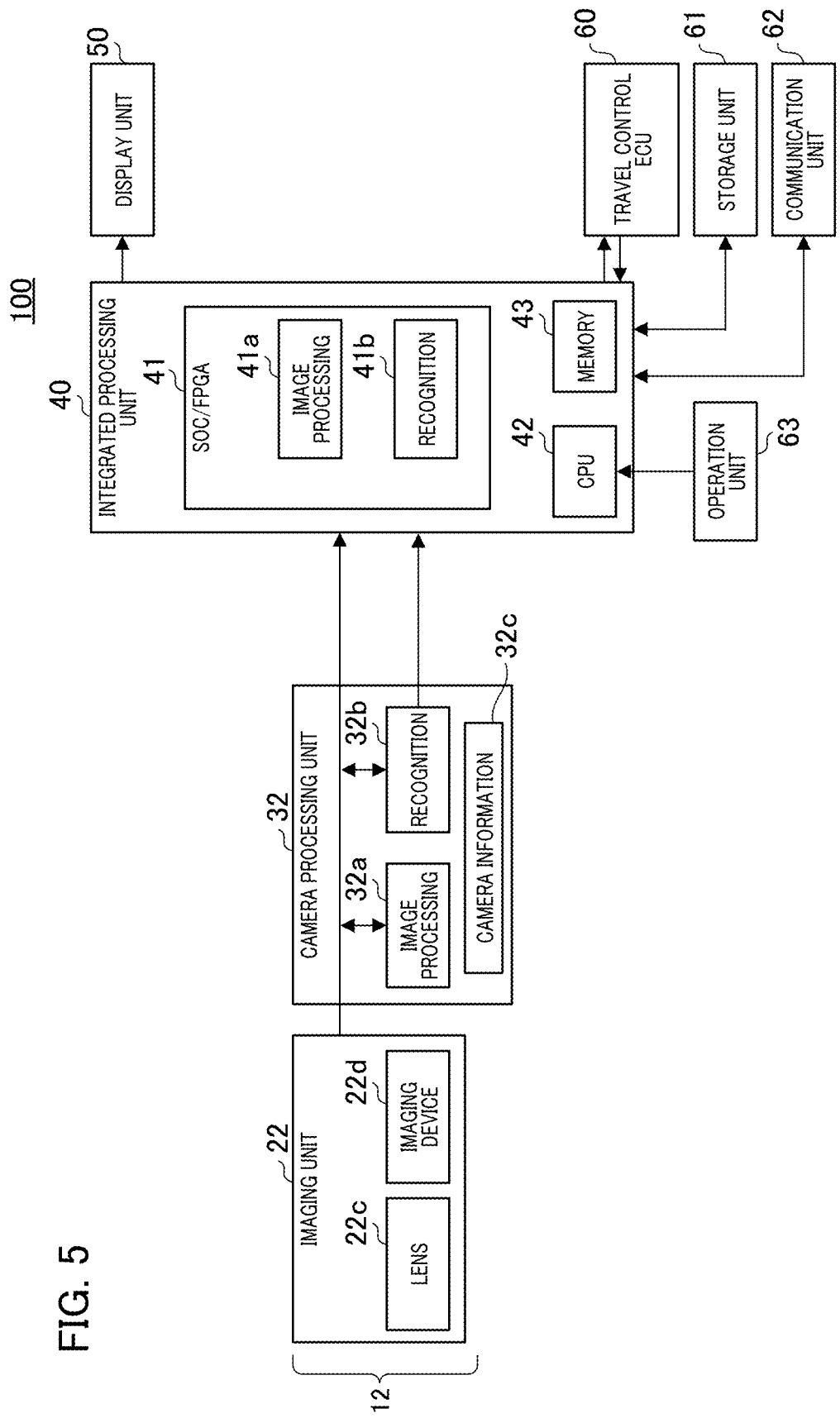
FIG. 5 is a functional block diagram of the imaging system according to the first embodiment.

FIG. 5 is a functional block diagram of the imaging system according to the first embodiment. Some of functional blocks illustrated in FIG. 5 are realized by causing a CPU or the like which is a computer included in the imaging system to execute a computer program stored in a memory which is a storage medium.

However, some or all of the functional blocks may be realized by hardware. A dedicated circuit (ASIC) or a processor (such as a reconfigurable processor or a DSP) can be used as hardware. The functional blocks illustrated in FIG. 5 may not be incorporated into the same housing, but may be constituted by different devices connected to each other via a signal line.

In FIG. 5, the imaging system 100 is mounted on a vehicle 1 which is a movable apparatus, and an imaging unit 22 and a camera processing unit 32 are disposed in the housing of the camera unit 12. The imaging unit 22 includes a lens 22c and an imaging device 22d such as a CMOS image sensor or a CCD image sensor.

The imaging unit 22 serves as an image acquiring unit, and the imaging unit (the imaging acquiring unit) includes an optical system that forms an optical image including a high-resolution area and a low-resolution area and acquires an image signal generated by the imaging unit.

The lens 22c which is an optical system includes one or more optical lenses, has projection characteristics y(θ) satisfying the condition of Expression 1 or Expression 2, and forms an optical image including a low-resolution area and a high-resolution area on the light receiving surface of the imaging device 22d.

The imaging device 22d converts the optical image in a photoelectric conversion manner and outputs an imaging signal. For example, color filters of RGB for each pixel are arranged on the light receiving surface of the imaging device 22d. The arrangement of RGB is, for example, a Bayer array.

Accordingly, the imaging device is configured to sequentially output signals of R, G, R, and G, for example, from a predetermined row based on the Bayer array, and to sequentially output signals of G, B, G, and B from a neighboring row.

The camera processing unit 32 along with the imaging unit 22 is accommodated in the housing of the camera unit 12 and processes the imaging signal output from the imaging unit 22. The camera processing unit 32 includes an image processing unit 32a, a recognition unit 32b, and a camera information unit 32c. The image processing unit 32a processes the imaging signal output from the imaging unit 22. Some or all functions of the camera processing unit 32 may be performed by a staked signal processing unit in the imaging device 22d.

Specifically, the image processing unit 32a performs white balance adjustment on image data input in a Bayer array from the imaging unit 22, performs de-Bayer processing thereon, and converts the input image data to image data in a raster format of RGB. The image processing unit 32a performs various correction processes such as gain adjustment, local tone mapping, gamma processing, color matrix processing, and lossless compression processing.

The recognition unit 32b recognizes a predetermined object (for example, a person, a sightline direction of a driver, or a state of a lower leg of a driver) from an image signal which has been processed by the image processing unit 32a but has not been subjected to distortion correction. That is, the recognition unit 32b performs image recognition on the image signal without performing distortion correction and outputs an image recognition result.

The recognition unit 32b may cut out an image signal acquired from the high-resolution area 20b and perform an image recognizing process on only the image signal acquired from the high-resolution area 20b. At this time, it is preferable that an area cut out for image recognition have a rectangular shape which is a shape appropriate for the image recognizing process.

The cut-out rectangular area may be only a part of the high-resolution area 20b (for example, a rectangle inscribed in the high-resolution area 20b) or may be a rectangle including both the high-resolution area 20b and the low-resolution area 20c.

Here, the recognition unit 32b serves as an image recognizing unit configured to perform image recognition based on an image signal of at least a partial area out of image signals acquired by the imaging unit (the image acquiring unit) and to output an image recognition result.

The recognition unit 32b transmits a set of a type of an object and coordinates as a recognition result to an integrated processing unit 40. The output of the recognition unit 32b of the camera unit 12 is also supplied to a travel control unit (ECU) 60.

This is because, when abnormality (for example, attack of a driver or drowsiness of a driver) or the like is detected by the recognition unit, it may be necessary to control traveling such that the vehicle decelerates or stops immediately based on the detection result.

The camera information unit 32c (a characteristic information holding unit) holds camera information of the camera unit 12 in a memory in advance. The camera information unit 32c may temporarily hold information from various types of sensors provided in the camera unit 12.

The camera information includes, for example, characteristic information (such as resolution boundary information) of an optical image formed by the lens 22c. The camera information also includes the number of pixels of the imaging device 22d, information of installation position coordinates and postures in a vehicle coordinate system of the camera unit 12, and an imaging direction. The camera information may include information such as gamma characteristics, sensitivity characteristics, and a frame rate.

The camera information may include information on an image processing method or an image format which is used when the image processing unit 32a generates an image signal. The installation position coordinates may be stored in the memory of the camera information unit in advance because an installation position of the camera unit 12 on the vehicle 1 is often determined.

The posture coordinates of the camera unit 12 are coordinates relative to the vehicle 1 and may be acquired from an encoder (not illustrated) or the like installed in the camera unit 12. The camera information is information specific to the imaging unit 22, and the information is transmitted to the integrated processing unit 40 and referred to when the integrated processing unit 40 performs image processing or the like. Here, the camera information unit 32c serves as a characteristic information holding unit configured to hold characteristic information of characteristics of an optical image.

A CPU which is a computer or a memory storing a computer program which is a storage medium is built in the camera processing unit 32. The CPU is configured to control the constituents of the imaging unit 22 or the camera processing unit 32 by executing the computer program in the memory.

In the present embodiment, the image processing unit 32a or the recognition unit 32b is realized, for example, by hardware such as a dedicated circuit (ASIC) or a processor (such as a reconfigurable processor or a DSP). Accordingly, it is possible to realize fast image recognition in a high-resolution area.

The image processing unit 32a may have a distortion correcting function. Some or all of functional blocks in the camera processing unit 32 may be realized by causing the CPU to execute a computer program stored in the memory.

Reference sign 40 denotes the integrated processing unit and includes a system on chip (SOC)/field programmable gate array (FPGA) 41, a CPU 42 which is a computer, and a memory 43 which is a storage medium.

The CPU 42 performs various types of control of the whole imaging system 100 by executing a computer program stored in the memory 43. In the present embodiment, the integrated processing unit 40 is accommodated in a housing other than that of the camera unit.

The SOC/FPGA 41 includes an image processing unit 41a and a recognition unit 41b. The image processing unit 41a acquires an image signal from the camera processing unit 32 and acquires camera information of the camera unit 12 from the camera information unit 32c.

The image processing unit 41a performs resolution conversion on the image signal from the camera processing unit 32 based on the camera information and performs distortion correction on the image signal acquired from the imaging unit 22.

The image processing unit 41a performs distortion correction using different parameters on an image signal of the low-resolution area 20c and an image signal in the high-resolution area 20b and can combine the image signals subjected to distortion correction to form an entire image.

The recognition unit 41b performs an image recognizing process on the entire image of the imaging unit 22 and recognizes a predetermined object (for example, a person, a sightline direction of a driver, a state of a lower leg of the driver) in at least the entire image of the imaging unit 22. Accordingly, abnormality such as attack on a driver, drowsiness of the driver, whether there is a person on a rear seat, or driving by an authorized driver is determined. At this time, the recognition result (a type or coordinates of an object) from the recognition unit 32b may be referred to.

The display unit 50 is installed, for example, in the vicinity of the center in a vehicle width direction of the upper part in front of the driver's seat of the vehicle 1 such that a display screen faces rearward and serves as an electronic rearview mirror. The display unit 50 includes a touch panel or an operation button and is configured to acquire an instruction from a user and to output the acquired instruction to the CPU 42.

The display unit 50 may be installed, for example, in the vicinity of an operation panel near the center in the vehicle width direction in front of the driver's seat of the vehicle 1. A navigation system, an audio system, or the like (not illustrated) is mounted in the vehicle 1 which is a movable apparatus.

For example, the display unit 50 may be configured to display various types of control signals from the navigation system, the audio system, or a travel control unit (ECU) 60. A liquid crystal display, an organic EL display, or the like can be used as a display panel of the display unit 50. The number of display units is not limited one.

The CPU 52 communicates with the travel control unit (ECU) 60 via a communication unit (not illustrated) provided therein using a protocol such as CAN, FlexRay, or Ethernet. Accordingly, the CPU 52 performs a display process of appropriately changing information to be displayed based on a vehicle control signal received from the travel control unit (ECU) 60 or the like.

That is, an image state or the like to be displayed on the display unit is changed based on a moving state of the vehicle, an open/closed state or a locked/unlocked state of a door, or the like acquired using the vehicle control signal.

The travel control unit (ECU) 60 is mounted in the vehicle 1 and is a unit including a computer or a memory for comprehensively performing drive control, direction control, and the like of the vehicle 1.

The travel control unit (ECU) 60 inputs, for example, information associated with traveling (a moving state) of the vehicle such as a traveling speed, a traveling direction, a shift lever, a shift gear, a state of a direction indicator, a vehicle direction based on a geomagnetic sensor, or the like as the vehicle control signal to the integrated processing unit 40. Information such as the open/closed state or the locked/unlocked state of a door or the like is also supplied to the integrated processing unit 40.

On the other hand, the CPU 42 transmits the predetermined object (for example, a person, a sightline direction of a driver, a state of a lower leg of the driver) recognized by the recognition unit 32b or the recognition unit 41b or information indicating that abnormality has occurred to the travel control unit (ECU) 60.

When abnormality or the like is detected by the recognition unit 32b or the recognition unit 41b, the travel control unit (ECU) 60 performs control for decelerating or stopping the vehicle or the like. Here, the travel control unit (ECU) 60 serves as a movement control unit configured to control movement of the vehicle which is a movable apparatus based on the image recognition result or the like.

Some or all of the functional blocks included in the integrated processing unit 40 or the like may be realized by hardware or may be realized by causing the CPU 42 to execute a computer program stored in the memory 43. A dedicated circuit (ASIC) or a processor (such as a reconfigurable processor or a DSP) can be used as the hardware.

Some or all of image processing performed by the image processing unit 32a may be performed by the image processing unit 41a of the integrated processing unit 40. In the present embodiment, the integrated processing unit 40 is mounted in the vehicle 1 which is a movable apparatus, but some processes of the image processing unit 41a and the recognition unit 41b of the integrated processing unit 40 may be performed by an external server or the like, for example, via a network.

In this case, the imaging unit 22 which is the image acquiring unit is mounted in the vehicle 1 which is a movable apparatus, and, for example, some functions of the camera processing unit 32 or the integrated processing unit 40 can be performed by the external server or the like. Some or all functions of the integrated processing unit 40 may be provided in the travel control unit (ECU) 60.

A storage unit 61 is a data storage that stores an entire image of the imaging unit 22 generated by the integrated processing unit 40. The storage unit 61 stores a CG image such as a predetermined frame, characters, or alarms indicating a recognized object or an image on which the CG image is superimposed and which is displayed on the display unit 50 or the like along with time, GPS information, or the like. The integrated processing unit 40 may be able to reproduce past information stored in the storage unit 61 and to display the information on the display unit 50.

A communication unit 62 serves to communicate with an external server or the like via a network and can transmit information not stored in the storage unit 61 or past information stored in the storage unit 61 to the external server or the like. An operation unit 63 is a user interface used to input various instructions to the imaging system through a user's operation. The operation unit includes, for example, a touch panel or an operation button.

In the present embodiment, the CPU 42 can perform control of image processing in the image processing unit 32a and exposure control (iris control or accumulation time control) in the imaging unit 22.

Figure 6:
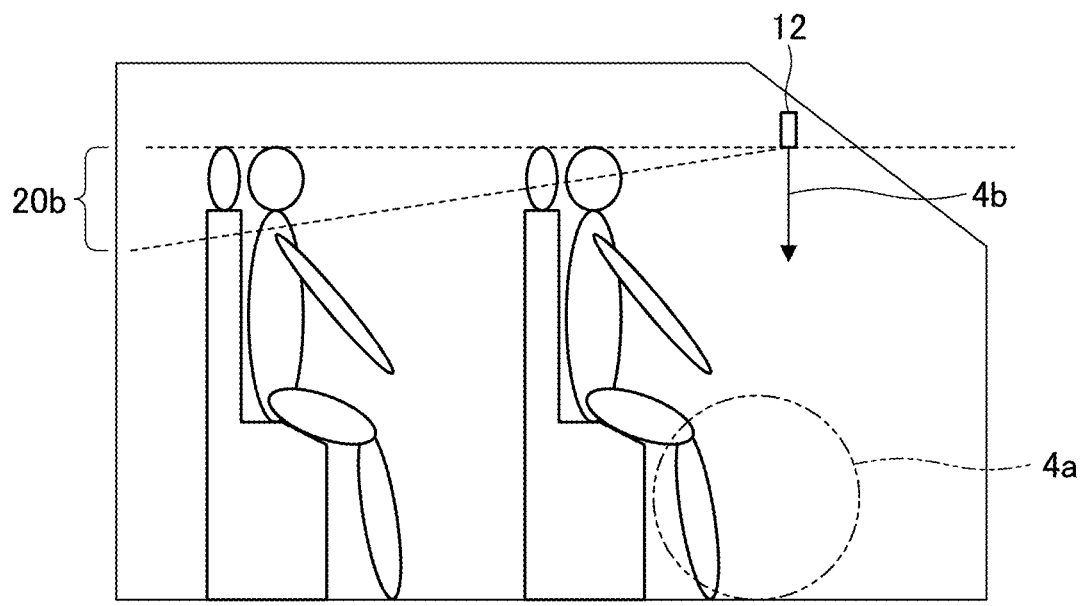
FIG. 6 is a diagram illustrating an example of the disposition position of the camera unit 12 according to the first embodiment.

FIG. 6 is a diagram illustrating an example of the disposition position of the camera unit 12 according to the first embodiment. In the example illustrated in FIG. 6, the camera unit 12 is disposed such that a driver's foot (such as a lower leg) 4a can be imaged and a headrest of a rear seat is included in the high-resolution area using the high-resolution area 20b.

At this time, as illustrated in FIG. 4A, imaging is performed such that a driver's hands and a steering wheel (a so-called handle) is included, for example, in the low-resolution area of the camera unit 12. The camera unit may be installed such that a backrest of a rear seat or a backrest of a front seat of the movable apparatus in addition to a headrest is included in the high-resolution area as illustrated in FIG. 4A. Alternatively, a child seat installed in a rear seat may be included in the high-resolution area.

In the example illustrated in FIG. 6, the camera unit 12 is disposed to capture an image in the vertical direction 4b, but is not limited thereto. In the present embodiment, the optical axis of the optical system has only to be disposed to face the rear side of the movable apparatus in a range in which an angle with respect to the vertical direction 4b ranges from 0 degrees to 30 degrees in a state in which the movable apparatus has a horizontal posture.

Second Embodiment

Figure 7A:
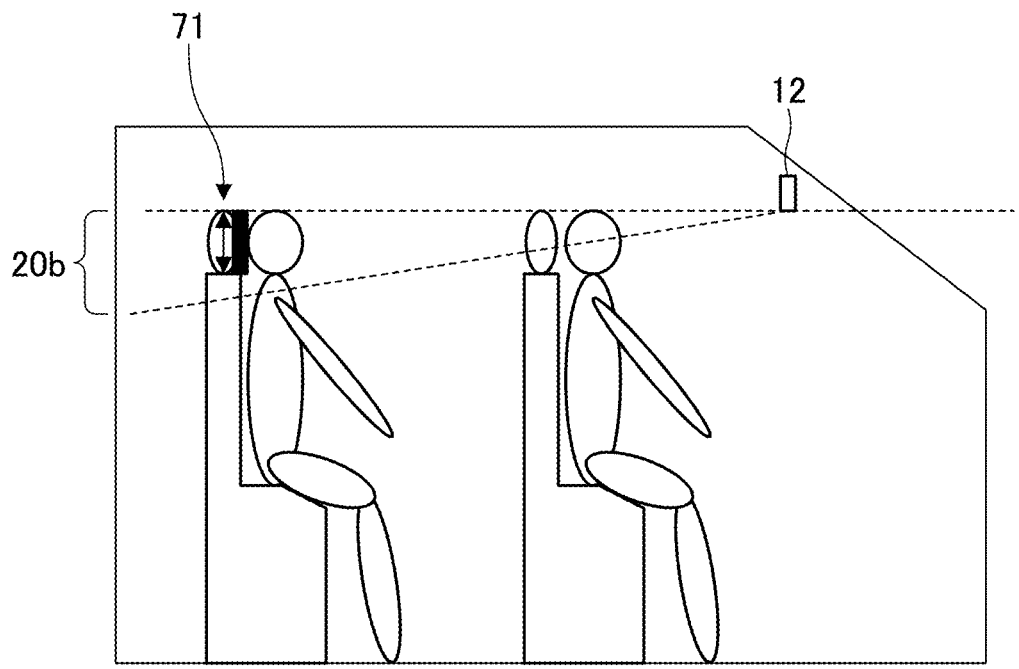
FIGS. 7A and 7B are diagrams illustrating an example of a disposition position of a camera unit 12 according to a second embodiment.
Figure 7B:
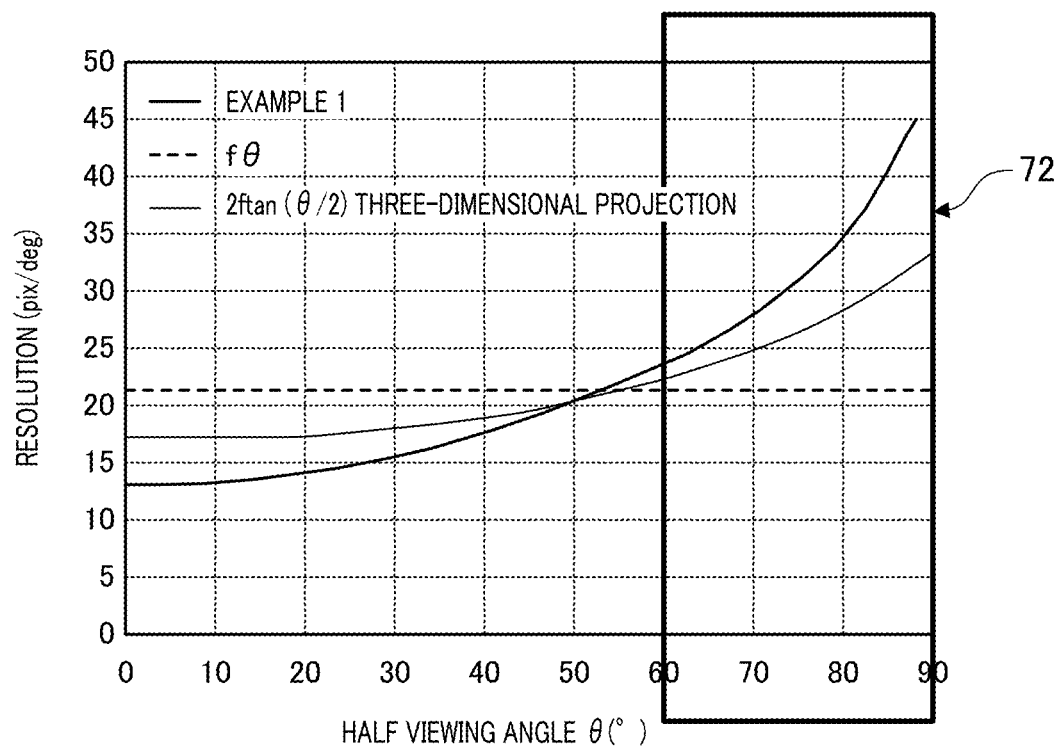

FIGS. 7A and 7B are diagrams illustrating an example of a disposition position of a camera unit 12 according to a second embodiment of the present invention. FIG. 7A is a diagram illustrating an example in which the periphery of a headrest of a rear seat is imaged using a high-resolution area, and FIG. 7B is a diagram illustrating an example of a resolution with respect to a half viewing angle θ.

In FIG. 7B, a bold solid line indicates a resolution curve, a thin solid line indicates a resolution curve of 2·f tan(θ/2), and a dotted line indicates a resolution curve of fθ in the second embodiment. In the second embodiment, it is preferable that the high-resolution area is a frame 72 illustrated in FIG. 7B.

That is, when a focal distance of equidistance projection (fθ) is defined as fg and a viewing angle which is 65% of a maximum half viewing angle is defined as θ65, it is preferable that y(θ65)>y(fg(θ65)) be satisfied. Alternatively, when a differential value of projection characteristics y(θ) is defined as y'(θ), it is preferable that y'(θ65)>y'(fg(θ65)) be satisfied.

Alternatively, when the half viewing angle of the optical system is defined as θ, a maximum half viewing angle of the optical system is defined as θmax, and a lower-limit half viewing angle of the high-resolution area is defined as θe, it is preferable that the condition of Expression 3 be satisfied.

$$0.5 < \theta e/max < 0.9 \qquad \text{(Expression 3)}$$

When Expression 3 is satisfied, the headrest 71 of the rear seat is reliably included in the high-resolution area by the camera unit 12 as illustrated in FIG. 7A.

It is more preferable that Expression 4 be satisfied.

$$0.6 < \theta e/max < 0.8 \qquad \text{(Expression 4)}$$

In this case, the headrest 71 of the rear seat is imaged and a face of a person sitting on the rear seat is more clearly imaged by the camera unit 12.

Third Embodiment

In a third embodiment, a height position of the upper part in which the optical system is disposed differs depending on a length in a longitudinal direction of the cabin of the vehicle.

Figure 8A:
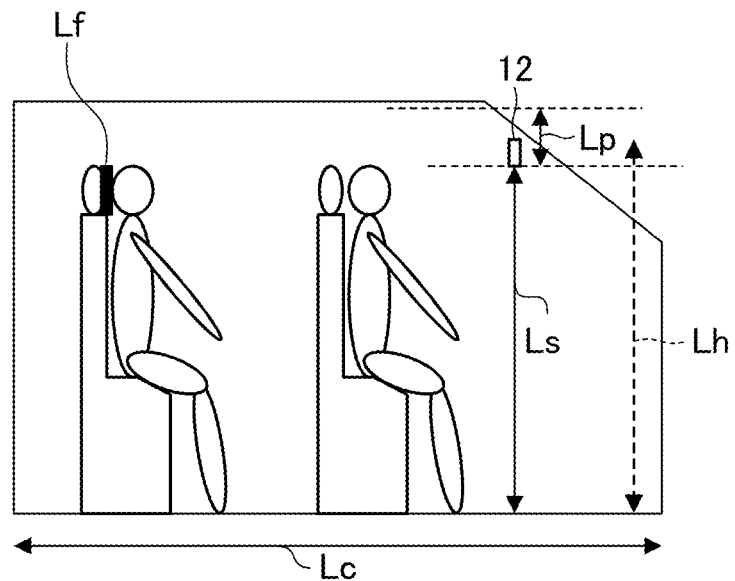
FIGS. 8A and 8B are diagrams illustrating an example of a disposition position of a camera unit 12 according to a third embodiment of the present invention.
Figure 8B:
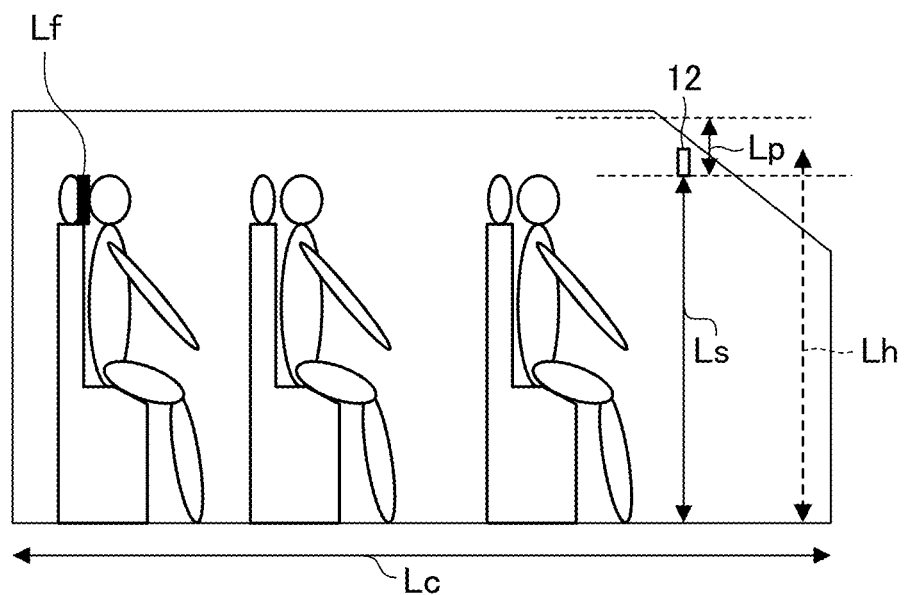

FIGS. 8A and 8B are diagrams illustrating an example of a disposition position of the camera unit 12 according to the third embodiment of the present invention. FIG. 8A illustrates an example of an installation position when the cabin includes two-row seats, and FIG. 8B illustrates an example of the installation position in which the cabin includes three-row seats.

As illustrated in FIGS. 8A and 8B, the height of the camera unit 12 is set to be larger as the length in the longitudinal direction of the cabin becomes larger. Specifically, when the length in the longitudinal direction of the cabin is defined as Lc and an allowable height of the installation position of the optical system is defined as Lh, the optical system is disposed to satisfy Expression 5. Accordingly, it is possible to image the periphery of the headrest of the rearmost-row seat using the high-resolution area.

$$0.3 < Lh/Lc < 0.7 \qquad \text{(Expression 5)}$$

Fourth Embodiment

Figure 9A:
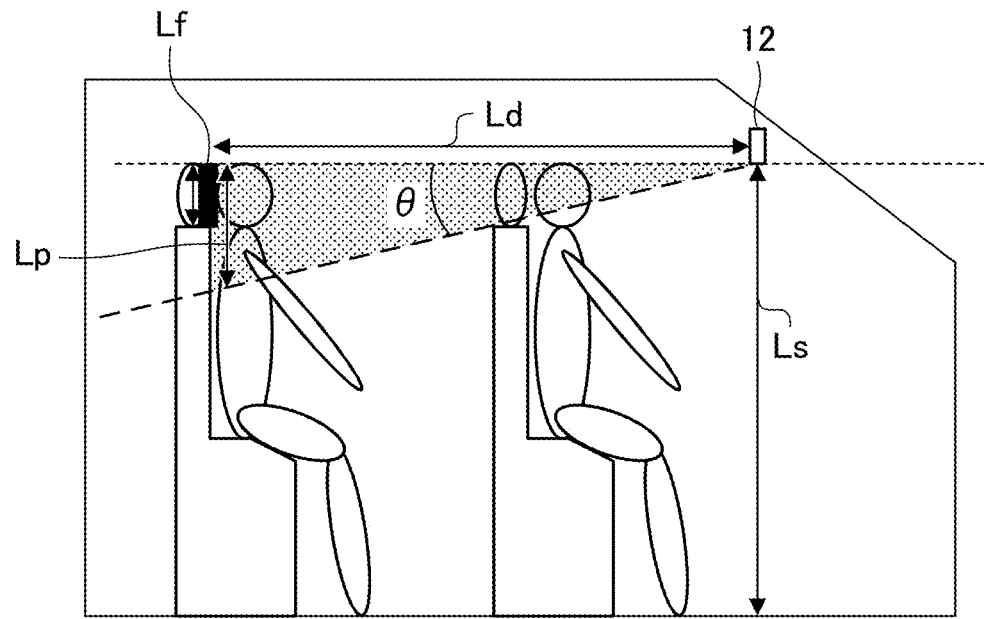
FIGS. 9A and 9B are diagrams illustrating an example of a disposition position of a camera unit 12 according to a fourth embodiment of the present invention.
Figure 9B:
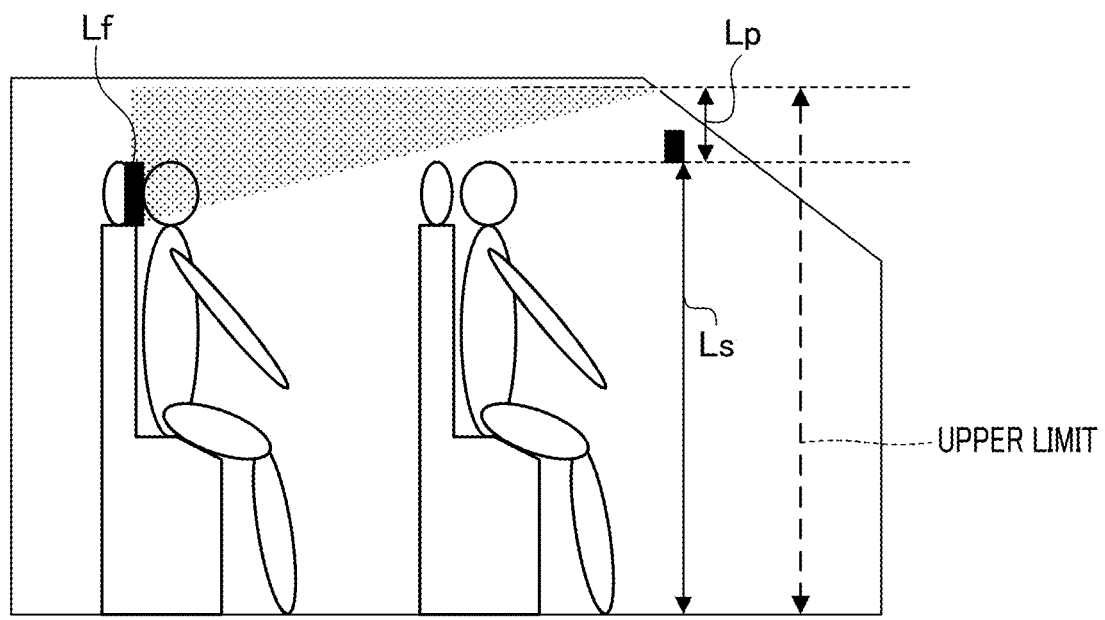

In a fourth embodiment, the height position of the upper part in which the optical system is disposed is set depending on an application of cabin imaging. FIGS. 9A and 9B are diagrams illustrating an example of a disposition position of the camera unit 12 according to the fourth embodiment of the present invention.

FIG. 9A illustrates an example in which the disposition position of the camera unit 12 according to the fourth embodiment is low, and FIG. 9B illustrates an example in which the disposition position of the camera unit 12 according to the fourth embodiment is high.

Here, the example illustrated in FIG. 9A is for mainly imaging all persons sitting on the front seats (which include a driver's seat) and the rear seats. This is suitable for a driver monitoring system and for monitoring a person (particularly a face) in the cabin.

The example illustrated in FIG. 9B is suitable for mainly imaging persons sitting on the rear seats. In this case, the backrests of the rear seats or bodies of persons sitting on the rear seats can be more easily imaged in comparison with the example illustrated in FIG. 9A. Particularly, in the example illustrated in FIG. 9B, a person such as a child sitting on a child seat can be easily imaged when the child seat is installed in the rear seats.

In FIGS. 9A and 9B, when a horizontal distance from the camera unit 12 to the rear seats is defined as Ld, a viewing angle of a high-resolution area is defined as θp, and a length in the height direction of the high-resolution area at a position corresponding to the rear seat is defined as Lp, Lp=Ld×tan θp is satisfied.

When a height of a headrest or a face of the rear seat is defined as Lf, an allowable amount of movement of the height position of the camera unit 12 can be expressed by Lh=Lp−Lf. Accordingly, when an allowable height of the camera unit 12 is defined as Lh and a height of a headrest of the driver's seat is defined as Ls, it is preferable that Expression 6 be satisfied.

$$Lh < 1.2 \times (Ls + Lp\text{-}Lf) \qquad \text{(Expression 6)}$$

It is more preferable that Expression 7 be satisfied.

$$Lh < (Ls + Lp\text{-}Lf) = (Ls + Ld \times \tan\theta p\text{-}Lf)$$

Fifth Embodiment

Figure 10A:
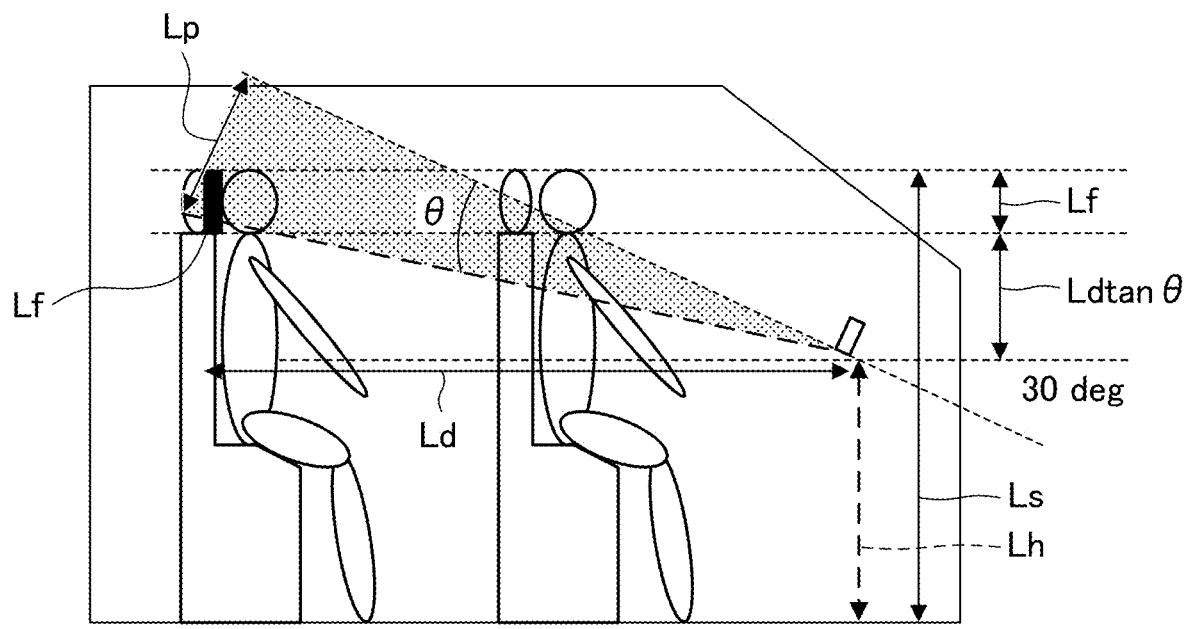
FIG. 10A is a diagram illustrating an example in which the camera unit 12 is disposed at a height lower than a driver's head and is inclined upward and FIG. 10B is a diagram illustrating an example in which the camera unit 12 is inclined such that a lower-limit viewing angle of a high-resolution area is disposed horizontally.

In a fifth embodiment, it is assumed that the camera unit 12 is disposed at the same height as a driver's head or below that height instead of being disposed on the ceiling. FIG. 10A is a diagram illustrating an example in which the camera unit 12 is disposed at a height lower than the driver's head and is inclined upward, and FIG. 10B is a diagram illustrating an example in which the camera unit 12 is inclined such that a lower-limit viewing angle of a high-resolution area is disposed horizontally.

Figure 10B:
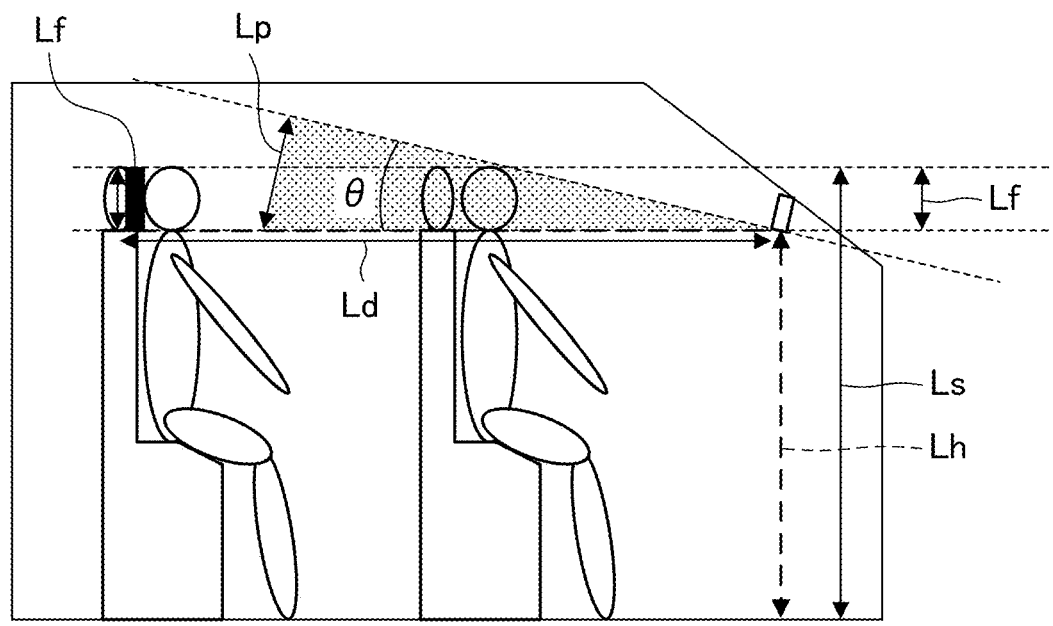

In FIGS. 10A and 10B, the horizontal distance from the camera unit 12 to the rear seat is defined as Ld, the viewing angle of the high-resolution area is defined as θ, the height of a headrest of the rear seat or a face height is defined as Lf, and an allowable height of the camera unit 12 is defined as Lh, and the height of the headrest of the driver's seat is defined as Ls.

In FIG. 10A, when an angle θx formed by the lower-limit viewing angle of the high-resolution area and the horizontal direction is substantially the same as θ, it is preferable that Expression 8 be satisfied.

$$Lh > Ls\text{-}Lf\text{-}Ld\tan\theta \qquad \text{(Expression 8)}$$

It is more preferable that Expression 9 be satisfied.

$$Lh > Ls\text{-}Lf \qquad \text{(Expression 9)}$$

Sixth Embodiment

Figure 11A:
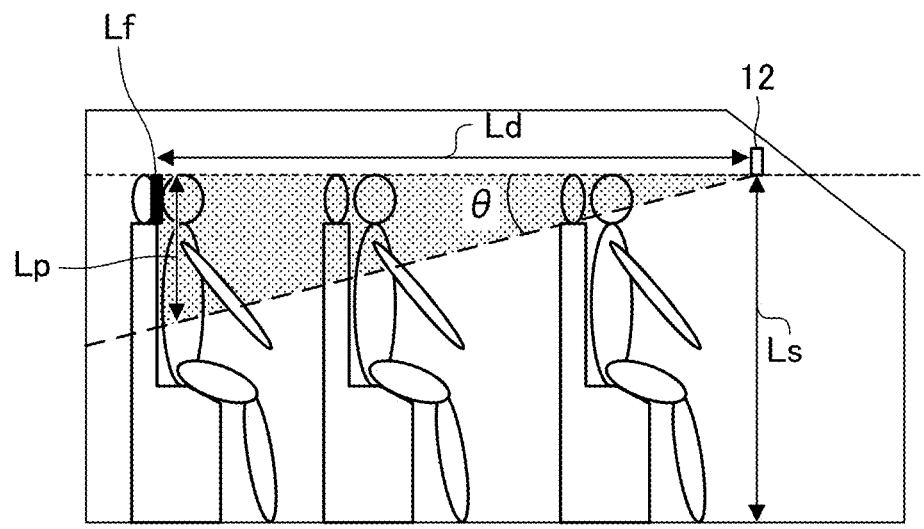
FIG. 11A is a diagram illustrating an example in which the camera unit 12 is disposed at the height of the driver's head and FIG. 11B is a diagram illustrating an example in which the camera unit 12 is disposed at a position higher than the height of the driver's head.

In a sixth embodiment, it is assumed that the camera unit 12 is disposed at a height position of a driver's head or at a higher position and the cabin includes three-row seats. FIG. 11A is a diagram illustrating an example in which the camera unit 12 is disposed at the height of the driver's height, and FIG. 11B is a diagram illustrating an example in which the camera unit 12 is disposed at a position higher than the height of the driver's head.

Figure 11B:
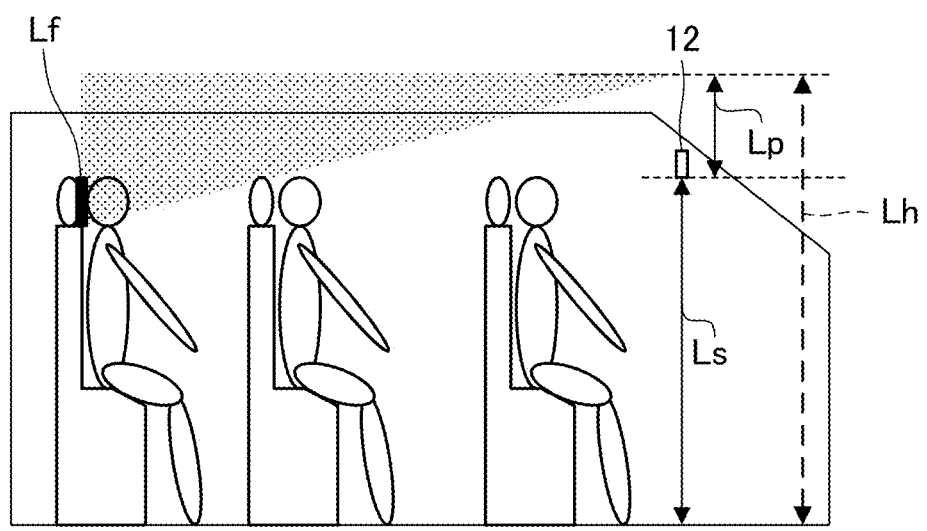

In the example illustrated in FIGS. 11A and 11B, it is preferable that an allowable camera height Lh satisfy Expression 10.

$$Lh/(Ls + Lp\text{-}Lf) < 0.9 \qquad \text{(Expression 10)}$$

Seventh Embodiment

Figure 12:
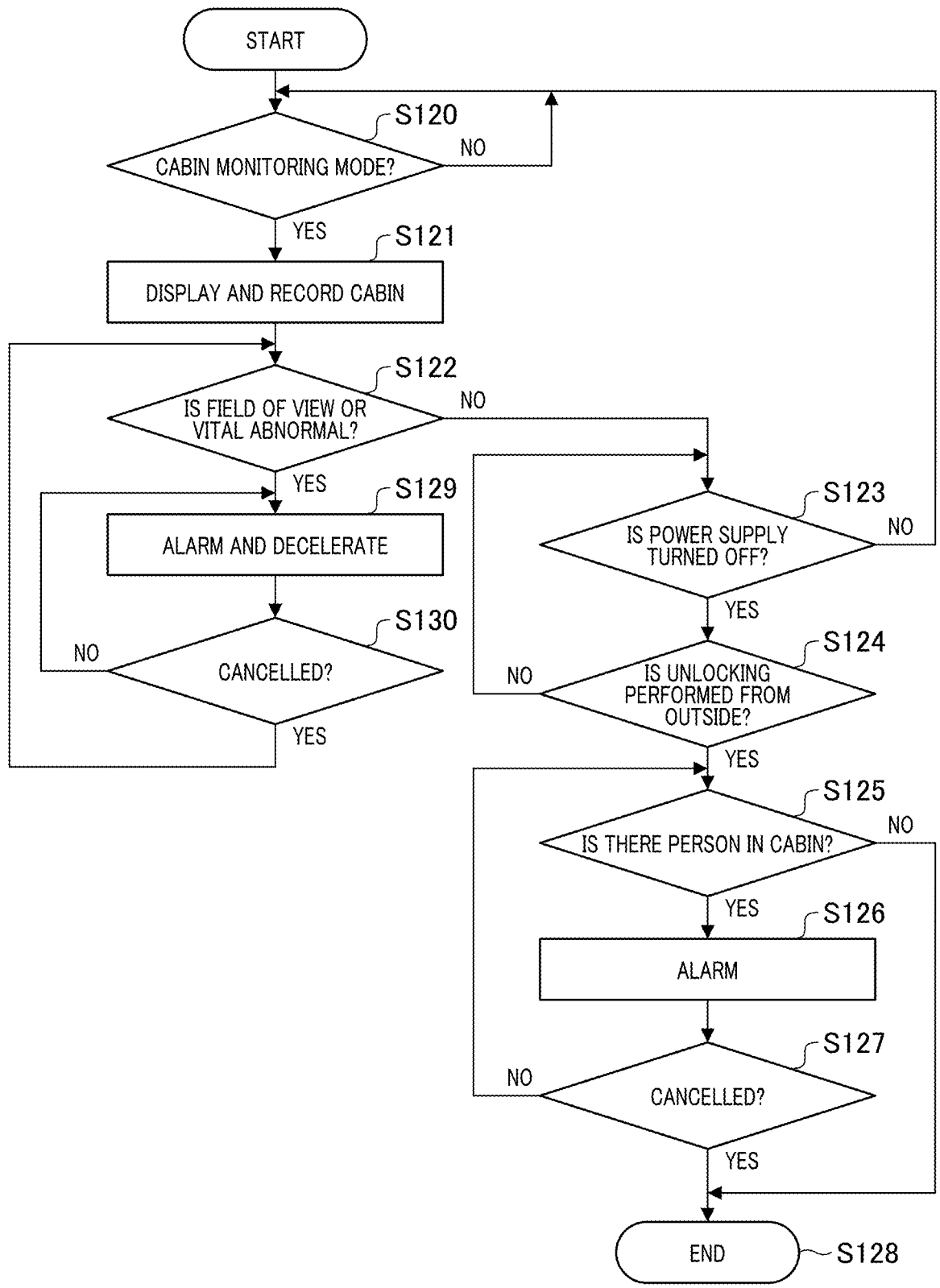
FIG. 12 is a flowchart illustrating an example of an imaging method in an imaging system according to a seventh embodiment.
Figure 13A:
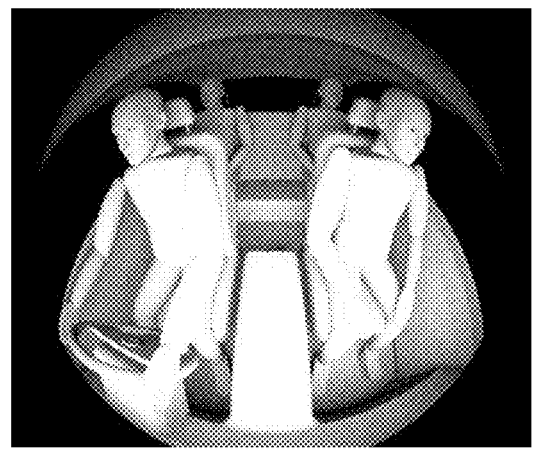
FIG. 13A is a diagram illustrating an example of an image of a fish-eye lens according to the related art and FIG. 13B is a diagram illustrating an example of an image when the direction of the fish-eye lens according to the related art is changed.
Figure 13B:
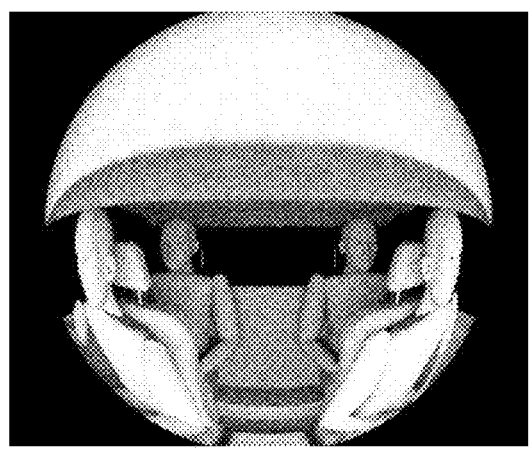

FIG. 12 is a flowchart illustrating an example of an imaging method in an imaging system according to a seventh embodiment. The processes of steps illustrated in FIG. 12 are performed by causing the CPU 42 which is a computer to execute a computer program stored in the memory 43 which is a storage medium.

In Step S120, the CPU 42 determines whether a cabin monitoring mode has been set. When a user operates the operation unit 63 to switch to the cabin monitoring mode, the determination result of Step S120 is YES and the process flow proceeds to Step S121. When the determination result of Step S120 is NO, the process flow returns to Step S120.

In Step S121, the CPU 42 displays an image of the cabin captured by the camera unit 12 on the display unit 50. At this time, for example, a partial area such as a driver's face or an upper half of a person on the rear seat in FIG. 4 may be cut, converted to a rectangular shape according to necessity, and displayed on the display unit 50. What partial area is to be displayed may be able to be selected by a user.

The image captured by the camera unit 12 is stored in the storage unit 61. Alternatively, the image may be transmitted to an external server or the like via the communication unit 62 and stored therein.

Then, in Step S122, the CPU 42 determines whether a sightline or vital information (biological information) of a driver or another person in the cabin of the movable apparatus is abnormal based on the image of the cabin captured by the camera unit 12. For example, when the time in which a face direction or a sightline of the driver departs from the front of the movable apparatus is equal to or greater than a predetermined time, the CPU 42 determines that it is abnormal.

This is for detecting drowsiness due to fatigue or the like or a faint due to a disease. For example, a heartbeat or the like of the driver or a person on the passenger's seat or the rear seat is counted as vital information from the image, and it is determined that it is abnormal when the heartbeat is out of a predetermined range or an irregular heartbeat or the like detected. Accordingly, it is possible to early find out abnormality of an occupant.

When it is determined in Step S122 that it is not abnormal, the process flow proceeds to Step S123 and it is determined whether a power supply of the movable apparatus is turned off. When the determination result of Step S123 is NO, the process flow returns to Step S120 and a series of steps described above are repeated.

On the other hand, when the determination result of Step S123 is YES, the process flow proceeds to Step S124 and the CPU 42 determines whether a door of the movable apparatus has been locked from the outside of the movable apparatus. When the determination result is NO, the process flow returns to Step S123.

When the determination result of Step S124 is YES, it is determined in Step S125 whether a person is left in the cabin such as the rear seat from the image of the camera unit 12. When the determination result of Step S125 is NO, the process flow proceeds to Step S128, the power supply of the movable apparatus is turned off, and the flow illustrated in FIG. 12 ends.

When it is determined in Step S125 that a person is left in the cabin, the process flow proceeds to Step S126 and the CPU 42 issues an alarm sound to the cabin or the outside of the movable apparatus to warn persons. At this time, an alarm may be transmitted to a smartphone or the like registered in advance via the communication unit 62. Alternatively, an alarm may be transmitted to a security company registered in advance.

As a result, for example, when an infant, a patient, or the like is left alone in the cabin and the door is locked, a person outside of the movable apparatus can see it. Thereafter, in Step S127, it is determined whether an alarm is cancelled. For example, the alarm is cancelled by unlocking the door.

When it is determined in Step S127 that an alarm is not cancelled, the process flow returns to Step S125. When it is determined in Step S127 that an alarm is cancelled, the process flow proceeds to Step S128, the power supply of the movable apparatus is turned off, and the flow illustrated in FIG. 12 ends.

On the other hand, when it is determined in Step S122 that a person in the cabin is abnormal, the process flow proceeds to Step S129, and the CPU 42 issues an alarm in the cabin. Alternatively, the CPU 42 notifies the travel control ECU 60 to decrease the traveling speed of the movable apparatus and to finally stop on a road side.

Display of an alarm and deceleration or the like may be performed together. Issuing of an alarm may be performed such that the outside of the movable apparatus can ascertain the alarm in addition to the cabin. In this case, issuing of an alarm may be performed using a method of continuously sounding a horn or turning on and off a hazard lamp.

In Step S130 subsequent to Step S129, it is determined whether an alarm is cancelled. When the determination result is NO, the process flow returns to Step S129 and issuing of an alarm or deceleration or stopping is continuously performed. When it is determined in Step S130 that an alarm is cancelled, the process flow returns to Step S122. In order to cancel an alarm in Step S130, for example, an operation of a cancellation switch for stopping issuing of an alarm or the like can be detected.

In this way, according to the seventh embodiment illustrated in FIG. 12, an alarm is issued into the cabin or to the outside of the movable apparatus or the movable apparatus decelerates and stops when abnormality in the cabin has been detected, and thus it is possible to prevent an accident or to reduce damage.

Steps S122 and S125 serve as a detection step (a detection unit) of detecting abnormality or being left alone based on an image acquired from the imaging unit. Step S129 serves as a control step (a control unit) of issuing an alarm or controlling driving of the movable apparatus when abnormality is detected by the detection unit.

Since an alarm is issued when the door is locked from the outside of the movable apparatus after the power supply is turned on and a person is left in the cabin, it is possible to prevent an infant or the like from being left alone. Since detection of abnormality of a driver or detection of being left alone can be performed based on an image with a high resolution, it is possible to reduce a detection error.

While an example in which an imaging system is applied to a car which is a movable apparatus has been described above, the movable apparatus may be a bus, a truck, a train, a ship, or an aircraft. The imaging system according to the embodiments may be mounted on the movable apparatus or may not be mounted thereon. For example, even when a movable apparatus is remotely controlled, it is possible to perform cabin monitoring according to the embodiments.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the imaging system through a network or various storage media. Then, a computer (or a CPU, an MPU, or the like) of the imaging system may be configured to read and execute the program. In such a case, the program and the storage medium storing the program configure the present invention.

The present invention includes, for example, at least one processor or circuit configured to realize functions of the embodiments explained above. The functions may be performed in a distributed manner using a plurality of processors.

This application claims the benefit of Japanese Patent Application No. 2022-211801, filed on Dec. 28, 2022, which is hereby incorporated by reference herein in its entirety.

What is claimed is:

1. An imaging system comprising:
an imaging unit; and
an optical system configured to form a low-resolution area at the center of a light receiving surface of the imaging unit and form a high-resolution area in the periphery of the light receiving surface,
wherein the optical system is disposed in an upper part of a cabin of a movable apparatus such that an optical axis of the optical system faces downward with respect to a horizontal plane in a state in which the movable apparatus has a horizontal posture, and
wherein, when a focal distance of the optical system is defined as f, a half viewing angle is defined as θ, an image height on an image plane is defined as y, projection characteristics indicating a relationship between the image height y and the half viewing angle θ are defined as y(θ), and a maximum half viewing angle of the optical system is defined as θmax, the optical system is configured to satisfy:

$$0.1 < 2 \times f \times \tan(\theta max/2)/y(\theta max) < 1.2.$$

2. The imaging system according to claim 1, wherein, when a focal distance of equidistance projection (fθ) is defined as fg and a viewing angle of 65% of the maximum half viewing angle is defined as θ65, y(θ65)>y(fg(θ65)) is satisfied.

3. The imaging system according to claim 1, wherein, when a focal distance of equidistance projection (fθ) is defined as fg, a viewing angle of 65% of the maximum half viewing angle is defined as θ65, and a differential value of the projection characteristics y(θ) is defined as y'(θ), y'(θ65)>y'(fg(θ65)) is satisfied.

4. The imaging system according to claim 1, wherein, when the half viewing angle of the optical system is defined as θ, the maximum half viewing angle of the optical system is defined as θmax, and a lower-limit half viewing angle of the high-resolution area is defined as θe, 0.5<θe/θmax<0.9 is satisfied.

5. The imaging system according to claim 1, wherein the upper part is a position in front of a driver of the movable apparatus.

6. The imaging system according to claim 1, wherein the upper part is a position between a driver's seat and a passenger's seat of the movable apparatus.

7. The imaging system according to claim 1, wherein the optical system is disposed such that an angle about a vertical direction in a state in which the movable apparatus has a horizontal posture ranges from 0 degrees to 30 degrees and the optical axis of the optical system faces rearward in the movable apparatus.

8. The imaging system according to claim 1, wherein the optical system is disposed such that a position in front of a driver's seat of the movable apparatus is included in the low-resolution area.

9. The imaging system according to claim 1, wherein the optical system is disposed such that a lower leg of a driver of the movable apparatus is included in the low-resolution area.

10. The imaging system according to claim 1, wherein the optical system is disposed such that a steering wheel of the movable apparatus is included in the low-resolution area.

11. The imaging system according to claim 1, wherein the optical system is disposed such that a backrest of a rear seat of the movable apparatus is included in the high-resolution area.

12. The imaging system according to claim 1, wherein the optical system is disposed such that a backrest of a front seat of the movable apparatus is included in the high-resolution area.

13. The imaging system according to claim 1, wherein the optical system is disposed such that a headrest or a child seat of a rear seat of the movable apparatus is included in the high-resolution area.

14. The imaging system according to claim 1, wherein a height position of the upper part in which the optical system is disposed is set depending on a length in a longitudinal direction of the cabin.

15. The imaging system according to claim 1, wherein, when a length in a longitudinal direction of the cabin is defined as Lc and an allowable height of a disposition position of the optical system is defined as Lh, 0.3<Lh/Lc<0.7 is satisfied.

16. The imaging system according to claim 1, wherein the optical system is disposed such that an outer part of the movable apparatus in the front of the movable apparatus is included in the high-resolution area.

17. The imaging system according to claim 1, wherein, when an allowable height of a disposition position of the optical system is defined as Lh, a horizontal distance from the imaging unit to a rear seat is defined as Ld, a viewing angle of the high-resolution area of the optical system is defined as θp, and a length in a height direction of the high-resolution area at a position corresponding to the rear seat is defined as Lp, Lh<(Ls+Ld×tan θp−Lf) is satisfied.

18. The imaging system according to claim 1, wherein a position at which the light receiving surface and the optical axis of the optical system cross is shifted from the center of the light receiving surface.

19. The imaging system according to claim 18, wherein, when a width of the light receiving surface is defined as Ls1 and an amount of shift is defined as Lshift, 0<Lshift/Ls1<0.5 is satisfied.

20. The imaging system according to claim 1, further comprising at least one processor or circuit configured to function as a detection unit configured to detect abnormality or being left alone based on an image acquired from the imaging unit.

21. The imaging system according to claim 20, wherein the detection unit detects abnormality of a person in the cabin or being left alone of a person in the cabin.

22. A movable apparatus comprising:
an imaging unit;
an optical system configured to form a low-resolution area at the center of a light receiving surface of the imaging unit and form a high-resolution area in the periphery of the light receiving surface; and
at least one processor or circuit configured to function as:
  a detection unit configured to detect abnormality or being left alone based on an image acquired from the imaging unit and
  a control unit configured to issue an alarm or to control driving of the movable apparatus when abnormality is detected by the detection unit,
wherein the optical system is disposed in an upper part of a cabin of a movable apparatus such that an optical axis of the optical system faces downward with respect to a horizontal plane in a state in which the movable apparatus has a horizontal posture, and
wherein, when a focal distance of the optical system is defined as f, a half viewing angle is defined as θ, an image height on an image plane is defined as y, projection characteristics indicating a relationship between the image height y and the half viewing angle θ are defined as y(θ), and a maximum half viewing angle of the optical system is defined as θmax, the optical system is configured to satisfy:

$$0.1 < 2 \times f \times \tan(\theta max/2)/y(\theta max) < 1.2.$$

23. A non-transitory computer-readable storage medium configured to store a computer program to control a movable apparatus, the movable apparatus comprising:
an imaging unit; and
an optical system configured to form a low-resolution area at the center of a light receiving surface of the imaging unit and form a high-resolution area in the periphery of the light receiving surface,
wherein the optical system is disposed in an upper part of a cabin of a movable apparatus such that an optical axis of the optical system faces downward with respect to a horizontal plane in a state in which the movable apparatus has a horizontal posture,
wherein, when a focal distance of the optical system is defined as f, a half viewing angle is defined as θ, an image height on an image plane is defined as y, projection characteristics indicating a relationship between the image height y and the half viewing angle θ are defined as y(θ), and a maximum half viewing angle of the optical system is defined as θmax, the optical system is configured to satisfy:

$$0.1 < 2 \times f \times \tan(\theta max/2)/y(\theta max) < 1.2, \text{ and}$$

wherein the computer program comprises instructions for executing following processes:
  a detection step of detecting abnormality or being left alone based on an image acquired from the imaging unit; and a control step of issuing an alarm or controlling driving of the movable apparatus when abnormality is detected in the detection step.

* * * * *